Feb. 1, 1966 — F. TURANCIOL — 3,232,466
FLOW CONTROLLABLE NURSING BOTTLE
Filed June 3, 1963 — 3 Sheets-Sheet 1

INVENTOR.
BY FUAD TURANCIOL
Robert W. Beach
ATTORNEY

Feb. 1, 1966  F. TURANCIOL  3,232,466
FLOW CONTROLLABLE NURSING BOTTLE
Filed June 3, 1963  3 Sheets-Sheet 2

INVENTOR.
BY FUAD TURANCIOL
Robert W. Beach
ATTORNEY

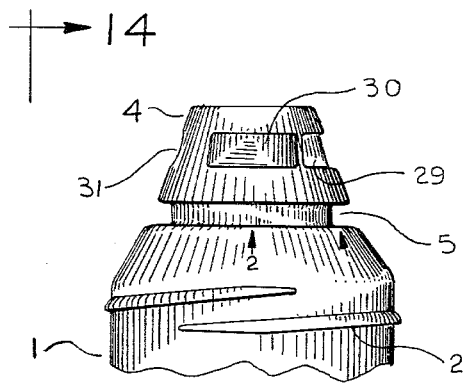
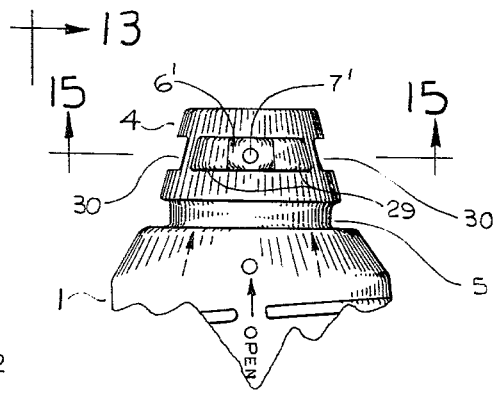
Fig. 13
Fig. 12
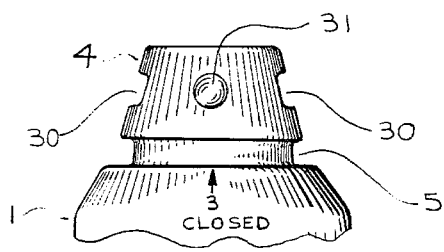
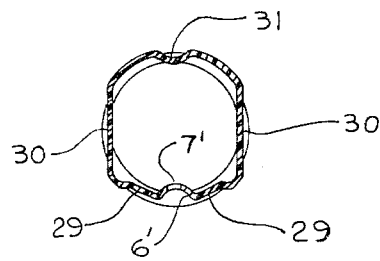
Fig. 14
Fig. 15
INVENTOR.
BY Fuad Turanciol
Robert W. Beach
ATTORNEY

3,232,466
FLOW CONTROLLABLE NURSING BOTTLE
Fuad Turanciol, Seattle, Wash.
(3205 Sherwood Drive, Mercer Island, Wash.)
Filed June 3, 1963, Ser. No. 284,966
7 Claims. (Cl. 215—11)

This invention relates to a nursing bottle for infants and more particularly to such a nursing bottle which can be adjusted to regulate the flow of milk or other liquid dispensed from the bottle through the nipple.

A principal object of the invention is to provide a construction capable of adjustment easily to regulate the flow of liquid from the nipple, and more particularly a cooperative construction of the nipple and bottle, which will enable such flow to be regulated by shifting the position of the nipple on the bottle. A subsidiary object is to enable the nipple and the bottle to be shifted relatively so as to deter all discharge of liquid from the bottle.

Another object is to provide a closure for the bottle which will cover the nipple and which will enable gas to escape from the bottle thus closed, but which will prevent entrance of gas into the bottle thus closed.

A further object is to provide such a bottle, nipple and closure construction which is capable of being sterilized while the parts are assembled and the bottle contains liquid.

Another object is to provide an arrangement for enabling liquid flow of the desired quantity to be extracted very easily from the nipple without such ease of extraction producing an undesirably large flow, if the nipple is manipulated vigorously.

In accomplishing these objects it is desirable to utilize a nursing bottle of light weight made of economical materials, and the parts of which are virtually indestructible.

A nursing bottle having such characteristics may include three principal parts, namely, a bottle having a neck, a nipple fitted on the bottle neck and a cap securable to the bottle in a position completely enclosing the nipple. The bottle and the cap can be made of inexpensive light plastic material which is quite stiff, although flexible, and the nipple can be made of fairly soft rubber or plastic material, as is conventional. The bottle neck and the nipple have overlapping portions of complemental shape, which bottle neck portion has in it a groove extending circumferentially which decreases progressively in depth along its length and the nipple has an inwardly extending apertured projection received in such groove and cooperating with the groove to vary the degree of throttling of the nipple aperture by relative rotational adjustment of the nipple and bottle. The cap has an annular inwardly projecting shoulder which is pressed axially against the rim of the nipple by axial movement of the cap toward the bottle in securing it to the bottle, so as to produce a sealing engagement between the nipple and the cap which will prevent passage of gas from the outside into the bottle without preventing escape of gas from the bottle.

Figure 4:
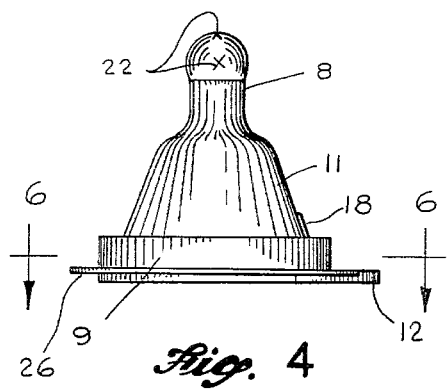
FIGURE 4 is an elevation corresponding to FIGURE 3 of the nipple alone and FIGURE 5 is an elevation of the nipple taken perpendicular to FIGURE 4.
Figure 5:
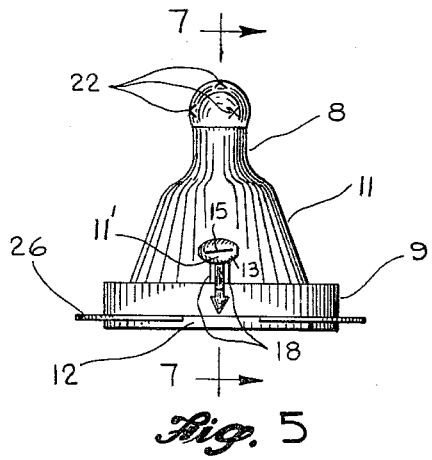
Figure 6:
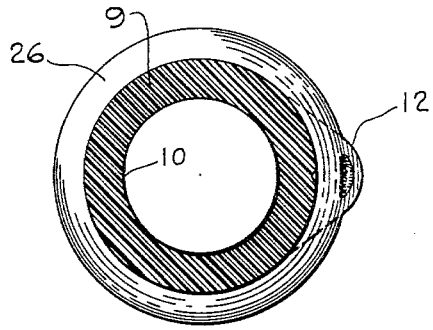
Figure 8:
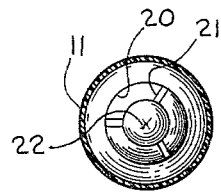
Figure 7:
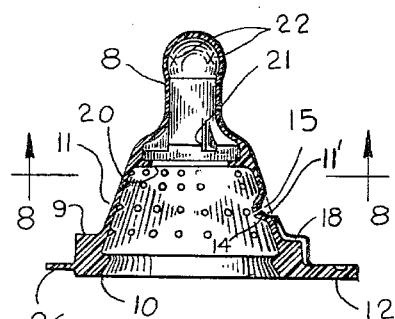

FIGURE 6 is a transverse section through the nipple of FIGURE 4 on line 6—6 of that figure. FIGURE 7 is a longitudinal section through the nipple on line 7—7 of FIGURE 5. FIGURE 8 is a transverse section through the nipple taken along line 8—8 of FIGURE 7.

Figures 9, 11:
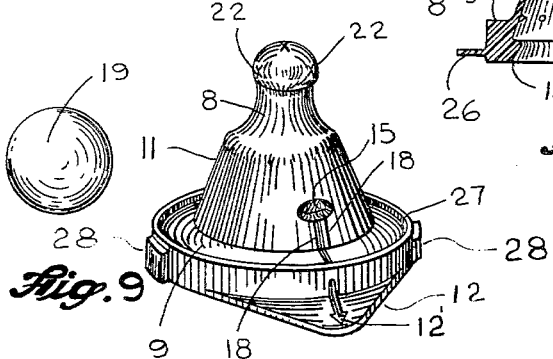

FIGURE 9 is a plan of a valve disk for the nipple of FIGURES 4 and 5.

Figure 3:
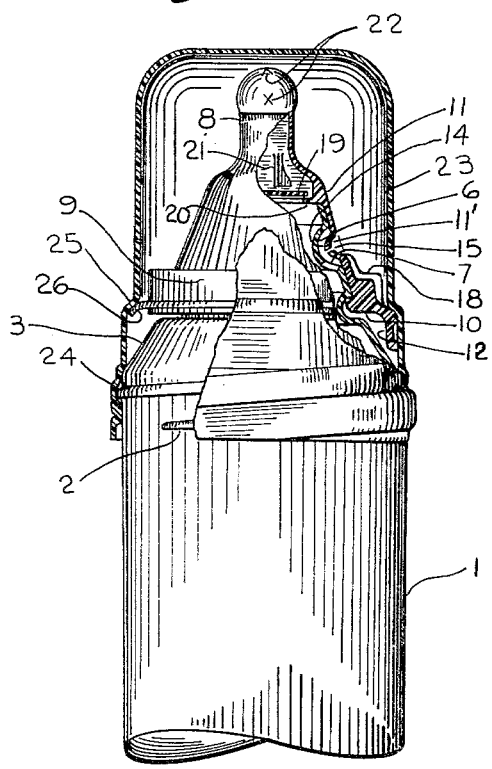
FIGURE 3 is an elevation of the neck and portion of the bottle similar to FIGURE 1, but with the nipple and cap on the bottle, and parts being broken away.
Figure 10:
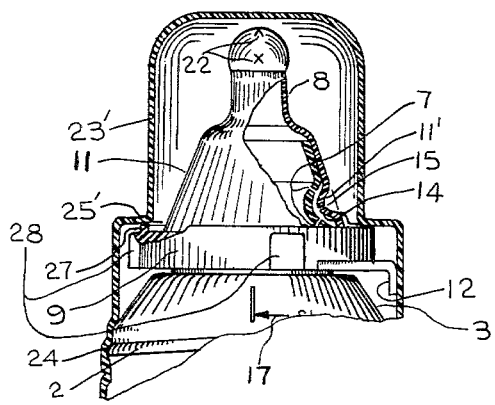

FIGURE 10 is a side elevation of the nursing bottle on which are mounted a nipple and a cap different from those shown in FIGURE 3, parts being broken away.

FIGURE 11 is a top perspective of a nipple of the type shown in FIGURE 10.

FIGURE 12 is a front elevation of the upper portion of a further modified type of container, FIGURE 13 is a side elevation of such upper portion seen from the line 13—13 of FIGURE 12, and FIGURE 14 is a rear elevation of the upper portion of such container, as seen from line 14—14 of FIGURE 13. FIGURE 15 is a transverse section through the neck of such container on line 15—15 of FIGURE 12.

In baby bottles it is very desirable to provide a construction in which an air vent to the interior of the bottle is provided independent of the opening through the nipple by which the contents of the bottle are discharged. It is further desirable for the air vent into the bottle to be capable of regulation in size so that the speed with which the contents of the bottle are discharged can be regulated. It has been found that such venting and regulation can be provided most effectively through the base portion of the nipple and the cooperation of such base nipple portion with the neck of the bottle.

The baby's bottle 1 preferably is of fairly stiff plastic material of flexible character such as of blown polyethylene plastic. The plastic material shell is located within a suitable mold and gas under pressure is introduced within the shell to expand it into intimate contact with the shell, which forms the exterior of the plastic shell in conformity to the interior shape of the mold. By this procedure the nursing bottle can be formed with an integral thread 2 adjacent to the neck end of the bottle, and such neck end can be formed to the desired contour. Such contour, as shown best in FIGURES 1 and 2, preferably includes a large frustoconical portion 3 connected directly to the cylindrical body wall of the bottle and a smaller frustoconical portion 4 projecting beyond the frustoconical portion 3.

Figure 1:
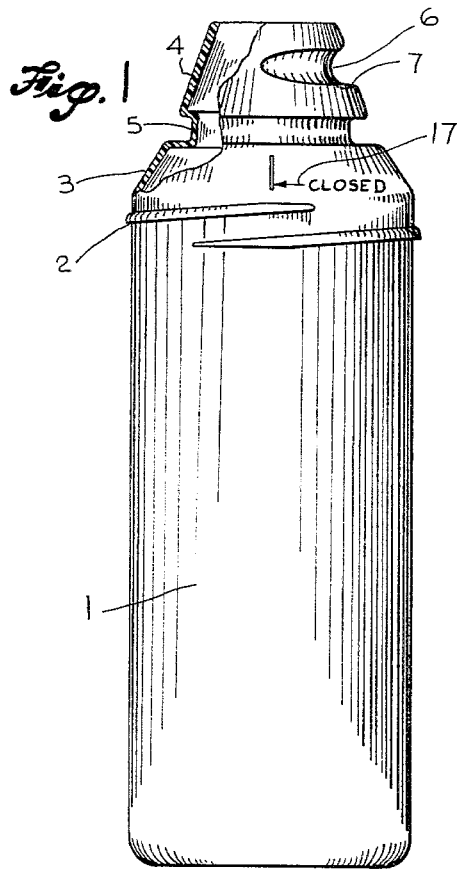
FIGURE 1 is an elevation of the nursing bottle with a portion of the neck broken away and FIGURE 2 is an elevation of the neck portion of the bottle taken perpendicular to FIGURE 1.
Figure 2:
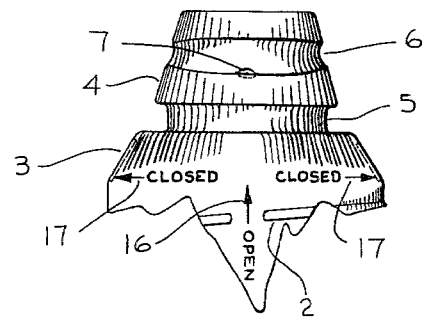

The angle of taper of the two frustoconical portions 3 and 4 may be the same or, as shown in FIGURE 1, the walls of the frustoconical portion 3 may converge at a steeper taper than the walls of the frustoconical portion 4. Such two frustoconical portions are connected by a circumferential groove portion 5, which provides a groove of substantially uniform depth about the entire circumference of the neck portion. In the frustoconical neck portion 4 is formed a further groove 6 extending circumferentially of the neck over approximately 200° of the neck's circumference. Such groove tapers in cross section, the direction of taper, as shown best by a comparison of FIGURES 1 and 2, being principally in groove depth, so that the depth of the groove decreases progressively in each direction circumferentially from the center portion of the groove. An aperture 7 extends through the neck wall at a convenient location, such as the central portion of the groove closer to the bottle body.

The nipple shown in FIGURES 4 to 9, inclusive, is of soft rubber material, such as specially compounded neoprene or may be of a type customarily used for nursing bottles. The tip 8 of the nipple can be of conventional shape and the rim 9 is provided with an internal circumferential flange 10 of a size and shape to engage the circumferential groove 5 sufficiently tightly to hold the nipple firmly in place while affording little friction between the nipple and the bottle. The wall portion 11 of the nipple between the rim 9 and tip 8 is of frustoconical shape slightly larger than and complemental to the frustoconical neck portion 4 of the bottle. When the rim flange 10 of the nipple is snapped into the groove 5, the nipple wall portion 11 will closely overlie the bottle neck portion 4; and in order to minimize contact between the nipple and such bottle neck portion, the interior of the nipple may have projections, such as points or buttons, projecting inwardly, as shown in FIGURE 7, to engage the bottle neck. The nipple can be applied to the bottle in this fashion by snap action effected by grasping the tab 12, placing the portion of flange 10 opposite such tap in the groove 5 and pulling the nipple down until the remainder of the flange 10 snaps into the groove.

One side of the nipple, and preferably that adjacent to the tab 12, has in it a depression 11' forming an inward projection 14 at a location axially of the nipple corresponding to the location of the circumferential groove 6 in the neck 4 of the bottle. This combined depression and inward projection has in its bottom a slit 15, as shown in FIGURES 5 and 7. Such projection extends inward a distance less than the depth of the groove 6 at its central portion, as shown in FIGURE 3, but such inward projection is greater than the side portions of the groove 6, shown in FIGURE 1. When the nipple and the bottle 1 are in the relatively rotated positions such that the tab 12 is in axial registry with the arrow 16 marked "open" in FIGURE 2, the projection 14 will be spaced from the bottom of the groove 6, as shown in FIGURE 3, so that the slit 15 will be unobstructed and the projection will be undeformed. As the nipple and the bottle are rotated relatively in either direction, as indicated by the "closed" arrows 17 from the position in which the tab 12 is substantially in registry with the arrow 16, the inward projection 14 will approach closer to the bottom of the groove 6 in the bottle neck 4, so as to throttle the passage through the slit 15 until eventually such slit is closed by engagement of the projection with the bottom of the groove.

When the inward projection 14 of the nipple is spaced from the bottom of the groove 6, air can pass inward through the slit 15 of the nipple and the aperture 7 of the bottle neck into the interior of the bottle. Even though the portion 11 of the nipple should be covered by the hand, a passage for flow of air inward through slit 15 is provided between the ribs 18 extending axially of the nipple from the depression 11' to the heavy bead 9. These ribs may define between them an arrow-shaped depression, as shown in FIGURE 5, to serve as an index cooperating with the arrow 16 for indicating the relative rotative positions of the nipple and bottle. For convenience a depressed arrow 12' may be provided on the tab 12 of the nipple to enable the rotative position of the nipple to be located more accurately with respect to the arrow 16 on the bottle.

The slit 15 is provided in the bottom of the depression 11' formed by the inward protuberance 14 so that such slit can open inwardly easily; but if the bottle is inverted and squeezed, the internal pressure exceeding the external pressure will press the slit closed to prevent escape of liquid from the bottle. The slit thus serves as a check valve preventing discharge of fluid from the bottle through it.

The nipple may be provided with an internal check valve taking the form of a disk 19, which can be placed in the nipple behind the resilient inwardly projecting circumferential flange 20. Axial movement of the disk would be limited in the outward direction by such flange and in the inward direction by radial lugs 21 spaced circumferentially of the nipple and projecting into its interior in positions spaced axially from the flange 20. The valve disk 19 will then float between the flange 20 and the lugs 21, as shown in FIGURE 3, so that liquid can pass around the periphery of such valve to the nozzle tip, but reverse flow of fluid, whether liquid or air, into the nipple portion 11 would be prevented by seating of the valve disk 19 on the flange 20.

While liquid may flow from the nozzle tip 8 through a conventional central nipple hole, it is preferred that a plurality of crossed slits 22 be provided in circumferentially spaced relationship around the nozzle tip, which can be opened readily by lateral pressure on such tip to provide discharge openings. Normally such crossed slits will resiliently close the openings in the nozzle tip, but the discharge of liquid through such slits can be accomplished much more readily than through the usual nipple tip aperture. In addition to the circumferentially spaced crossed slits one can be provided in the center, as shown in FIGURES 5 and 8, if desired.

In order to protect the exterior of the nipple from contamination, and also to seal the bottle completely, a cap 23 can be provided, as shown in FIGURE 3, to cover the nipple completely. The skirt of this cap is provided with internal threads 24 complemental to the external threads 2 on the body of the bottle, so that the cap can be screwed onto the bottle. Such cap, like the bottle, should be made of fairly stiff light plastic which is nevertheless somewhat flexible, such as polyethylene molded to the desired shape. Between the skirt and the closed end the cap has a circumferentially extending offset 25 forming an internal annular shoulder adjacent to the heavy bead 9 of the nipple. From such bead a radial flange 26 can project outward for engagement by the shoulder of the offset 25, as shown in FIGURE 3, when the cap is screwed onto the bottle body. Such engagement of the cap shoulder with the nipple flange may bend the flange into the position shown in FIGURE 3 so as to effect a seal against passage of fluid from the exterior of the cap into its interior beyond the offset 25, while enabling fluid to deflect the nipple flange 26 for passage from the interior of the cap toward its skirt and through the loosely fitting internal thread passage 24 to the exterior of the cap.

In FIGURES 10 and 11 a somewhat different form of nipple is shown but the parts of this nipple similar to the parts of the nipple described above have been numbered correspondingly. In this instance the heavy bead 9 has a circumferential rib 27 projecting axially toward the nipple tip 8 instead of having the radially projecting flange 26. The cap 23', shown in FIGURE 10, has an offset 25' located closer to the closed end of the cap than the offset 25 of the cap 23, shown in FIGURE 3. Also, the portion of the cap adjacent to its closed end is of smaller diameter than the corresponding portion of cap 23. The purpose of this difference is to locate the internal shoulder of the cap formed by the offset 25' in a position to abut the edge of the nipple rib 27 to effect a seal between the nipple and the cap.

If fluid pressure in excess of atmospheric occurs within the cap 23', such pressure will deflect the heavy bead 9 downward and the rib 27 outward sufficiently to enable the gas under pressure to flow past the rib 27 for escape to the atmosphere through the passage formed by the internal threads 24 in the skirt of the cap 23' being larger than the external threads 2 on the body of the bottle.

The bottle 1, nipple and cap 23, or 23', should all be of material which will not be deteriorated or deformed by sterilizing temperatures. The construction of the assembly is such that milk or other food can be sterilized in place in the bottle and the liquid filled bottle can then be kept safely at refrigerator temperatures until it is ready for use. Specifically, the bottle 1 may be filled with milk, for example, and one or the other of the nipple and cap assemblies described above applied to the bottle to complete the assembly shown in FIGURE 3, or FIGURE 10. If the entire assembly is then heated to a sterilizing temperature within the range of 210 to 215° F., the liquid vapor and air generated within the bottle will pass out through the apertures formed by cuts 22, into the space between the nipple and the cap and will bend the nipple flange 25 in FIGURE 3, or the heavy bead 12 and rib 27 in FIGURE 10, so that such air and vapor can escape through the threads 24 to relieve the pressure within the bottle and nipple, and within the cap 23 or 23' above atmospheric pressure.

When the sterilization has been completed the closed bottle is removed from the sterilizer and cooling of the liquid vapor and air remaining within the nipple and cap 23 will tend to reduce the volume of the vapor, so that its pressure will decrease below atmospheric. The air at atmospheric pressure within the cap below the flange 25, shown in FIGURE 3, cannot pass into the portion of the cap covering the nipple, however, because such air will simply press the flange 25 against the shoulder of the cap to form a tight seal. Correspondingly, air at atmospheric pressure below the rib 25', shown in FIGURE 10, will press the heavy bead 12 and rib 27 against the shoulder 25' of cap 23' to form a seal preventing entrance of air into the portion of the cap 23' covering the nipple.

The space within the bottle, the nipple and the cap 23, or 23', will thus be sealed effectively from communication with the atmosphere and the bottle can be stored at refrigerator temperatures of 33° F. to 40° F. for a long period of time without deterioration. When it is desired to use the bottle it can be warmed until the milk is at a tepid temperature. The cap 23, or 23', can then be unscrewed from the bottle to expose the sterilized nipple. Thus, it is not necessary to sterilize the bottle and the nipple prior to the bottle being filled with milk, as long as these elements are clean. The sterilizing operation described above will insure the complete sanitary character of the bottle parts contacted by the milk and the mouth of the baby.

By grasping the tab 12 of the nipple or pressing oppositely against the lugs 28 projecting from opposite sides of the rib 9 with one hand and holding the bottle 1 in the other hand, the nipple and bottle can be rotated relatively to place the slit 15 in a position relative to the bottle neck groove 6, so as to limit the flow of air through the slit into the groove and through the aperture 7 in the bottom of the groove into the bottle to the extent desired for regulating the outflow of milk from the nipple through the cuts 22. As milk is withdrawn through the nipple cuts by manipulation of its tip, such milk will be replaced by air passing into the bottle through the slit 15, groove 6 and aperture 7, until the bottle is empty. It is not necessary for the liquid withdrawn from the bottle to be replaced by air passing through the mouth of the baby through the apertures formed by cuts 22, although any air in the mouth of the baby can escape into the bottle in this way. Provision of the air supply slit 15 and aperture 7 will insure that the minimum amount of air is swallowed by the baby with the milk.

In FIGURES 12 to 15 inclusive, a bottle having a neck of somewhat different character is shown, with which either type of cap described above can be used. The corresponding nipple type would be used with the cap selected except that the nipple should not have inward projections as shown in FIGURE 7. The cap can be secured on the bottle 1 by the thread 2, as described, and the nipple can be held in place on the bottle by engagement of the inwardly projecting nipple flange 10 in the annular groove 5 of the bottle neck. The taper of the neck 4, in general, is the same as in the bottle previously described, but in this instance the recess 6' having in its bottom the vent opening 7' is located in a groove 29 extending around approximately 90°. Circumferentially displaced from the groove 29 are flat-bottomed grooves 30 in opposite sides of the neck, the bottoms of which are disposed substantially perpendicular to the bottom of groove 29. In the side of the bottle neck opposite the groove 29 is a depression 31 in which the inward projection 14 of a nipple can fit.

With the construction shown in FIGURES 12 to 15, inclusive, small rotational movement of the nipple does not control the air vent passage critically. When the inward protuberance 14 of the nipple is in any rotative position in registry with the recess 6', shown in FIGURES 12 and 15, relatively free venting of the bottle will occur. When the nipple is rotated to place the protuberance 14 in registry with either groove portion 29 at opposite sides of the recess 6', the slit 15 is partially closed to restrict the venting. If the nipple is rotated a quarter turn in either direction from registry of protuberance 14 with recess 6', the nipple protuberance will be located at approximately the center of one or the other of grooves 30, in which position the slit 15 will be fully open. Limited bleed of air will be afforded through the vent opening 7' of the bottle neck, however, because of the restricted passage between the nipple wall and the rib separating grooves 29 and 30. When the nipple is turned on the neck of the bottle through another quarter turn to locate the protuberance 14 in registry with the depression 31, the nipple slit 15 may again be fully open, but venting of the bottle will be interrupted because of the lack of passage for air between the nipple wall and the wide neck ribs at opposite sides of the depression 31.

As the nipple is turned from a position in which the nipple protuberance 14 is engaged with one of the groove portions 29 into a position in which the protuberance is engaged with one of the groove portions 30, the protuberance will be pressed outwardly by the neck rib separating such grooves; and, as the nipple is turned farther, the protuberance will snap into the other groove. Similarly, as the nipple is turned from a position in which the protuberance is engaged in one of the grooves 30 into a position in which such protuberance is engaged in the depression 31, such protuberance will be pressed outward by the rib separating one of the grooves 30 from the depression 31 and the protuberance will then snap into the depression 31 as it comes into registry with it. The same action occurs as the nipple is rotated in the opposite direction, the snap action occurring after protuberance 14 moves from the depression 31 into a groove 30 or from a goove 30 into the adjacent groove 29. As the nipple is rotated between such positions, therefore, a distinct click will be felt indicating that the nipple has been rotated from one definite position of adjustment into another having the characteristics discussed above.

I claim as my invention:

1. A baby's bottle assembly comprising a bottle including an upstanding neck having a depression with an aperture in such depression, a nipple fitting over said bottle neck including an inward projection receivable in such depression and having an aperture therethrough, said projection extending inwardly from said nipple a distance insufficient to engage the bottom of said bottle neck depression, and means engaged between said bottle and said nipple guiding said bottle and said nipple for relative rotation to move said projection circumferentially of said bottle neck relative to such aperture for altering the passage of air through such bottle neck aperture and said nipple aperture.

2. A baby's bottle assembly comprising a bottle including an upstanding neck having a first depression in one side thereof with an aperture in such depression, and a second depression in said upstanding neck spaced circumferentially thereof from said first depression and separated therefrom by a raised portion, and a nipple fitting over said bottle neck including an inward projection receivable in each of such depressions and movable from one such depression to the other by relative rotation of said bottle and said nipple, and said nipple projection having an aperture therethrough, said projection extending inwardly from said nipple a distance insufficient to engage the bottom of either of said bottle neck depressions.

3. A baby's bottle assembly comprising a bottle including an upstanding neck having a depression with an aperture in such depression, a nipple fitting over said bottle neck including an inward projection receivable in such depression and having a venting aperture therethrough, said projection extending inwardly from the general inner surface of said nipple a distance insufficient to engage the bottom of said bottle neck depression, and means guiding said nipple for rotation relative to said bottle to engage the apertured portion of said nipple's inward projection with a portion of said bottle's neck alongside said bottle neck depression for closing such venting aperture.

4. The baby's bottle assembly defined in claim 3, in which the nipple projection aperture is a slit closable by fluid pressure against the inner side of the projection.

5. A baby's bottle assembly comprising a bottle including an upstanding neck having a circumferential groove in one side thereof, an aperture in such groove and said groove decreasing progressively in depth in a direction circumferentially away from such aperture, and a nipple fitting over said bottle neck including an inward projection receivable in such groove and having an aperture therethrough, said projection extending inwardly from said nipple a distance sufficiently great to engage said projection in such bottle neck groove for varying the degree of opening through the nipple projection aperture by relative rotation of the bottle and nipple.

6. A baby's bottle assembly comprising a bottle including an upstanding neck having therein a plurality of depressions spaced circumferentially of said neck and defining a rib extending lengthwise of said neck between adjacent depressions, one of such depressions having an aperture therein, and a nipple fitting over said bottle neck including an inward projection receivable in each of such depressions and having a venting aperture therethrough, said projection extending inwardly from the general inner surface of said nipple a distance insufficient to engage the bottom of said bottle neck depression having such aperture, and means guiding said nipple for rotation relative to said bottle for engagement of said nipple's inward projection with the several neck recesses.

7. A baby's bottle assembly comprising a bottle including an upstanding neck having a smooth surface tapered away from the bottle and a nipple fitting over said bottle neck and rotatable relative thereto, including a portion of substantial axial extent tapered complemental to the taper of said bottle neck and having a plurality of spaced projections projecting inwardly therefrom for engagement with the smooth tapered surface of said bottle neck.

References Cited by the Examiner
UNITED STATES PATENTS

| | | | |
|---|---|---|---|
| 1,146,639 | 7/1915 | Miller. | |
| 1,996,493 | 4/1935 | Schumacher. | |
| 2,434,611 | 1/1948 | Hamiel | 215—11.2 |
| 2,571,010 | 10/1951 | Busch | 215—11.2 |
| 2,579,194 | 12/1951 | Kronish. | |
| 2,834,496 | 5/1958 | Boston | 215—11 |
| 2,989,961 | 6/1961 | Blanchett | 215—11 |
| 2,996,207 | 8/1961 | Witz | 215—11 |
| 3,097,757 | 7/1963 | Searer | 215—11 |

THERON E. CONDON, *Primary Examiner.*